United States Patent
Song et al.

(10) Patent No.: US 8,438,385 B2
(45) Date of Patent: May 7, 2013

(54) METHOD AND APPARATUS FOR IDENTITY VERIFICATION

(75) Inventors: Zhexuan Song, Silver Spring, MD (US);
Seigo Kotani, Rockville, MD (US);
Sung Lee, Great Falls, VA (US);
Keishiro Tanaka, Shinyokohama (JP);
Houcheng Lee, Baltimore, MD (US);
Jesus Molina, Washington, DC (US);
Ryusuke Masuoka, Potomac, MD (US);
Tomihiro Yamazaki, Nakahara-Ku (JP)

(73) Assignee: Fujitsu Limited, Kawasaki-shi (JP)

( * ) Notice: Subject to any disclaimer, the term of this patent is extended or adjusted under 35 U.S.C. 154(b) by 1306 days.

(21) Appl. No.: 12/048,096

(22) Filed: Mar. 13, 2008

(65) Prior Publication Data

US 2009/0235068 A1 Sep. 17, 2009

(51) Int. Cl.
*H04L 29/06* (2006.01)
*G06F 7/04* (2006.01)

(52) U.S. Cl.
USPC .......................................... 713/156; 726/17

(58) Field of Classification Search .................... 713/156
See application file for complete search history.

(56) References Cited

U.S. PATENT DOCUMENTS

| | | | | |
|---|---|---|---|---|
| 5,638,446 A * | 6/1997 | Rubin | ........................... | 705/51 |
| 5,935,248 A | 8/1999 | Kuroda | ........................ | 713/201 |
| 6,173,390 B1 | 1/2001 | Kotani et al. | .................. | 712/37 |
| 6,678,821 B1 * | 1/2004 | Waugh et al. | ................. | 713/168 |
| 7,058,619 B2 * | 6/2006 | Wanish | ................................. | 1/1 |
| 7,100,044 B2 * | 8/2006 | Watanabe et al. | ............. | 713/156 |
| 7,249,177 B1 * | 7/2007 | Miller | ........................... | 709/225 |
| 7,877,611 B2 * | 1/2011 | Camacho et al. | ............. | 713/182 |
| 2001/0034836 A1 * | 10/2001 | Matsumoto et al. | .......... | 713/176 |
| 2002/0184046 A1 | 12/2002 | Kamada et al. | .................... | 705/1 |
| 2003/0135732 A1 * | 7/2003 | Vaha-Sipila | .................. | 713/156 |
| 2004/0059924 A1 * | 3/2004 | Soto et al. | ..................... | 713/186 |
| 2004/0068650 A1 * | 4/2004 | Resnitzky et al. | ............ | 713/155 |
| 2004/0093505 A1 | 5/2004 | Hatakeyama et al. | ........ | 713/189 |
| 2004/0139316 A1 | 7/2004 | Kotani | .......................... | 713/156 |
| 2004/0193916 A1 | 9/2004 | Kamada et al. | ............... | 713/200 |
| 2005/0033973 A1 | 2/2005 | Kamada et al. | ............... | 713/193 |
| 2005/0228687 A1 | 10/2005 | Houtani | ........................... | 705/1 |
| 2005/0248809 A1 | 11/2005 | Yu | ................................. | 358/1.18 |
| 2005/0253994 A1 | 11/2005 | Kamijima et al. | ............ | 349/155 |

(Continued)

FOREIGN PATENT DOCUMENTS

| | | | |
|---|---|---|---|
| GB | 2386803 A | * | 9/2003 |
| WO | WO 2004/053664 A1 | | 6/2004 |
| WO | WO 2005/106620 A1 | | 11/2005 |

*Primary Examiner* — Nathan Flynn
*Assistant Examiner* — Abdullah Almamun
(74) *Attorney, Agent, or Firm* — Baker Botts L.L.P.

(57) ABSTRACT

A method for identity verification includes receiving a request for proof of identity from a service provider and receiving biometric information associated with a user of a communication device. The method also includes determining that the received biometric information matches a biometric profile that contains biometric information associated with a registered user of the communication device. The method also includes unlocking a private key associated with the registered user in response to determining that the received biometric information matches a biometric profile and sending a request for a digital certificate that is signed with the private key associated with the registered user. The method further includes receiving the digital certificate that includes a public key associated with the registered user and satisfies the request for proof of identity. The method also includes with forwarding the digital certificate to the service provider.

18 Claims, 3 Drawing Sheets

U.S. PATENT DOCUMENTS

| | | | |
|---|---|---|---|
| 2005/0256875 A1 | 11/2005 | Rietschel | 707/10 |
| 2005/0257272 A1 | 11/2005 | Nakao | 726/26 |
| 2005/0287990 A1* | 12/2005 | Mononen et al. | 455/411 |
| 2006/0015748 A1 | 1/2006 | Goto et al. | 713/190 |
| 2006/0053302 A1 | 3/2006 | Yasaki et al. | 713/183 |
| 2006/0107285 A1* | 5/2006 | Medvinsky | 725/25 |
| 2007/0078885 A1* | 4/2007 | Klein, Jr. | 707/102 |
| 2007/0245148 A1* | 10/2007 | Buer | 713/182 |
| 2009/0201128 A1* | 8/2009 | Campisi | 340/5.53 |
| 2010/0242102 A1* | 9/2010 | Cross et al. | 726/7 |

* cited by examiner

METHOD AND APPARATUS FOR IDENTITY VERIFICATION

TECHNICAL FIELD

This disclosure relates in general to communication systems and more particularly to a method and apparatus for identity verification.

BACKGROUND

When communicating over an unsecured public network, such as the Internet, it may be desirable to allow users to securely and privately exchange data. Such security may be particularly desirable when a user is requesting one or more services from a service provider, such as an online store. One method used to enhance security is to encrypt communications between parties. While encryption may prevent a user without a decryption key from reading or eavesdropping on the communications, encryption alone does not verify that the user requesting the service is not an impostor.

One method to verify the identity of a user requesting services, is to require the user to register with the service provider before engaging in a transaction. By providing the right username and password, the user's identity may be verified. Notwithstanding the additional security provided by this identity verification technique, an impostor may still steal the user's password and username. Additionally, this approach may require a user to remember multiple username and password combinations for different service providers.

Another method for identity verification is public key cryptography. Public key cryptography involves the use of asymmetric public-private key pairs. A user may maintain the private key which may be used to decrypt messages that are encrypted using a well-known public key. The private key may also be used to sign messages sent from the user to a service provider. The service provider may verify the authenticity of the signature using the public key. Although a user may not have to remember a user name and password, public key cryptography may not be suitable for identity verification when an impostor steals a given user's communication device. Additionally, if the impostor has gained control or corrupted the user's communication device, then the impostor may have direct access to the private key.

To enhance the security of public key cryptography identity verification, a public key infrastructure (PKI) may be established. In a PKI, a certificate authority may issue digital certificates in response to verifying a request for a digital certificate from a user. So long as the service provider trusts the certificate authority, and the user certificate can be verified, the user's identity may be verified. However, because the user certificate is stored in a key store at the certificate authority or in the user's communication device, an impostor may steal the identity of the user by gaining access to, or control of, the certificate authority and/or the user's communication device.

SUMMARY OF THE DISCLOSURE

The present disclosure provides a method and apparatus for identity verification that substantially eliminates or reduces at least some of the disadvantages and problems associated with previous methods and systems.

According to one embodiment, a method for identity verification may begins with receiving a request for proof of identity from a service provider. The method continues with receiving biometric information associated with a user of a communication device and determining that the received biometric information matches a biometric profile that contains biometric information associated with a registered user of the communication device. The method also includes unlocking a private key associated with the registered user in response to determining that the received biometric information matches a biometric profile. The method further includes sending a request for a digital certificate, wherein the request for the digital certificate is signed with the private key associated with the registered user and receiving the digital certificate. According to one embodiment, the digital certificate includes a public key associated with the registered user and satisfies the request for proof of identity. The method may conclude with forwarding the digital certificate to the service provider.

Also provided is an apparatus for identity verification that includes a memory and a processor coupled to the memory. The memory is operable to store a biometric profile that includes biometric information associated with a registered user of a communication device. The processor is operable to receive a request for proof of identity from a service provider and receive biometric information associated with a user of a communication device. The processor may further determine that the received biometric information matches biometric information associated with the registered user and unlock a private key. The processor may thereby send a request for a digital certificate signed with the private key associated with the registered user. The processor may also receive a digital certificate that includes a public key associated with the registered user and satisfies the request for proof of identity. The processor may forward the digital certificate to the service provider.

Technical advantages of certain embodiments of the present disclosure include providing real-time secure identity verification. More particularly, by locking a private key associated with a registered user of a communication, only a verified and registered user may obtain access to the private key which may be used for identity verification using a public-key cryptography. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
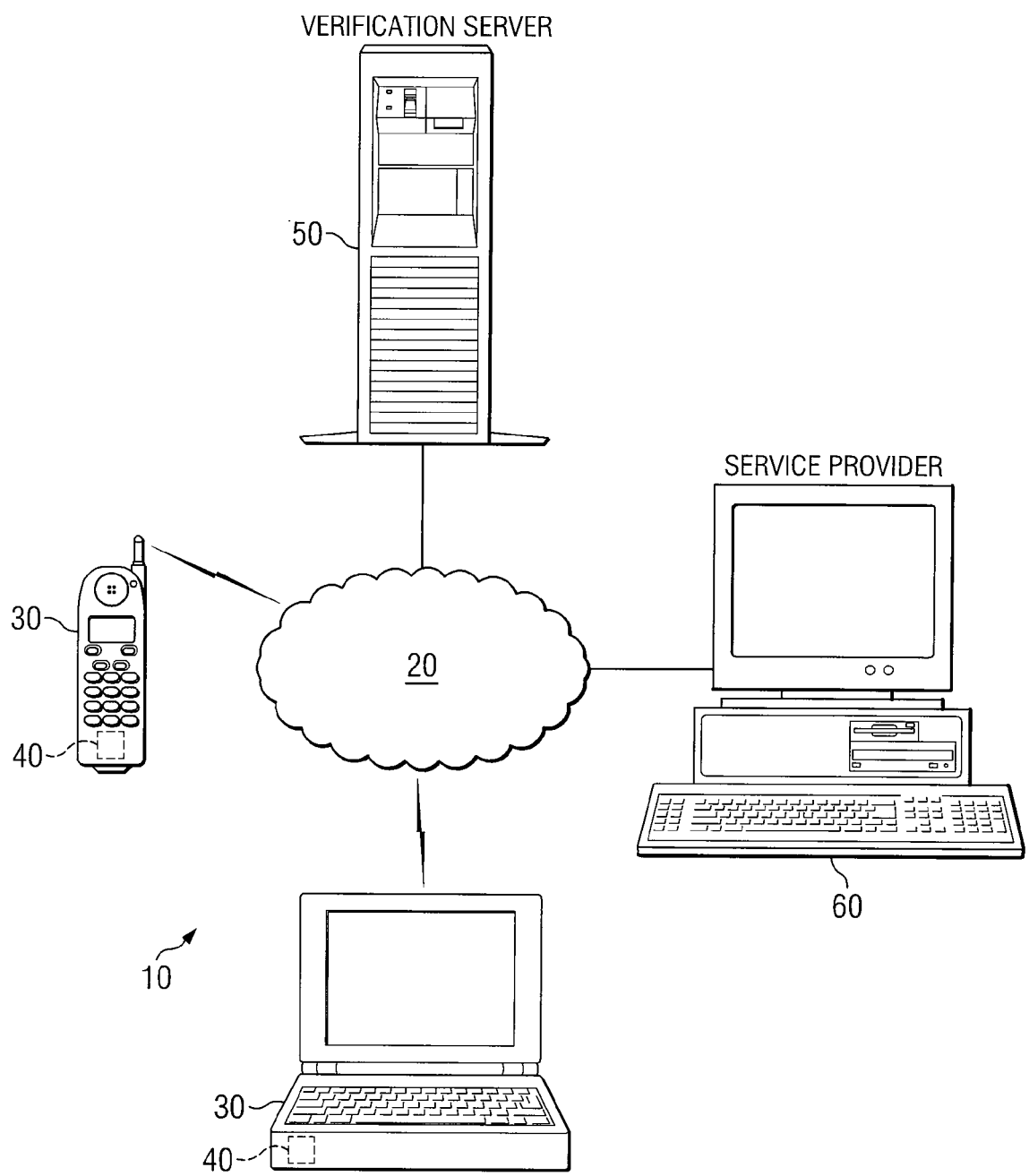
FIG. 1 is a simplified block diagram illustrating an identity verification system that supports messaging services for a plurality of users according to a particular embodiment.

FIG. 1 is a simplified block diagram of an identity verification system 10. According to the illustrated embodiment, identity verification system 10 includes communication network 20, communication device 30, verification server 50, and service provider 60.

In general, the components of identity verification system 10 may use a public-key infrastructure (PKI) to securely verify one or more requests for services by a user of communication device 30. According to a particular embodiment, the PKI may be enhanced by locking, or securely storing a private key associated with the communication device 30 and/or user. The private key may be unlocked only by a user who is able to provide appropriate biometric information. For purposes of this specification, biometric information may include any physical trait or characteristic which is unique to a user such as, for example, facial, retina, or iris patterns; a fingerprint; or voice.

As illustrated, communication network 20 represents any network capable of transmitting audio and/or video telecommunication signals, data, and/or messages. In certain embodiments, communication network 20 may comprise all, or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. In operation, communication network 20 provides connectivity between components coupled to communication network 20 using any appropriate communication protocol. To facilitate the described communication capabilities, communication network 20 may include routers, hubs, switches, gateways, call controllers, and/or any other suitable components in any suitable form or arrangement. Additionally, communication network 20 may include any hardware and/or software configured to communicate information in the form of packets, cells, frames, segments or other portions of data. Although communication network 20 is illustrated as a single network, communication network 20 may comprise any number or configuration of networks. Moreover, certain embodiments of identity verification system 10 may include any number or configuration of communication networks 20.

Communication devices 30 may represent any suitable combination of hardware, software, and/or encoded logic to provide communication services to a user. Among other things, communication devices 30 may represent a telephone; cell phone; personal digital assistant (PDA); computer running telephony, e-mail, or other forms of messaging and/or communication software; or any other communication hardware, software, and/or encoded logic that supports communication of voice, video, text or other forms of data using identity verification system 10.

As illustrated, communication devices 30 include a biometric acquisition unit 40. Biometric acquisition unit 40 represents a biometric information receiving and/or input means. In operation, biometric acquisition unit 40 may acquire biometric information associated with a user of communication device 30. As mentioned, biometric information may include a fingerprint, voice, retinal data or other information which may uniquely identify a user of communication device 30. Thus, if a fingerprint is the form of biometric information used for user identification, biometric acquisition unit 40 may be a fingerprint scanner. By contrast, when a voice profile is the biometric information used to identify a user, biometric acquisition unit 40 may be a microphone or other suitable audio recording device. It should be noted that, in certain embodiments, a communication device 30 may have multiple biometric acquisition units 40.

Verification server 50 may represent a trusted third party that manages security credentials and public keys for message encryption and digital signature authentication. In the traditional PKI architecture, verification server 50 may perform the dual function of certificate authority and registration authority. Accordingly, verification server 50 may not only verify a digital signature associated with a communication device 30 requesting a digital certificate, but also issue the digital certificate. In general, the digital certificate may contain a public key associated with the private key of a communication device 30 and the digital signature of verification server 50. Additionally, in certain embodiments, verification server 50 may also have an associated public-private key pair. The private key may be used by verification server 50 to sign the digital certificate. The public key may be well known and used by one or more components of identity verification system 10, such as service provider 60, to authenticate the digital certificate.

Service provider 60 may generally represent any combination of hardware and software, including controlling logic, for providing one or more services to a user of communication device 30. In particular embodiments, as an example only, service provider 60 may represent an Internet store which sells products online. In other embodiments, as an example only, service provider 60 may represent an application service provider which provides access to particular applications, software or other media over a network. Such applications, software, or media may include, among other things, ring tones, games, movies or songs. As another example, service provider may also be an online networking website or an Email provider.

In operation, service provider 60 may request proof of the identity of the user of a communication device 30 before granting access to requested services. To satisfy the request for proof of identity, the communication device 30 may forward a digital certificate issued by verification server 50. The digital certificate may be issued by verification server 50 in response to receiving a request for a digital certificate signed with a private key associated with the user of the communication device 30. In general the private key and an associated public key may be assigned to the user during a registration process which may occur when the communication device is initially purchased. Verification server 50 may authenticate the signature associated with the request using the public key associated with the user. If the signature associated with the request is authentic, verification server 50 may issue a digital certificate signed using its private key. The signed digital certificate may be sent to communication device 30 which may forward the certificate to service provider 60. Service provider 60 may verify the authenticity of the digital certificate using the public key associated with verification server 50.

Figure 2:
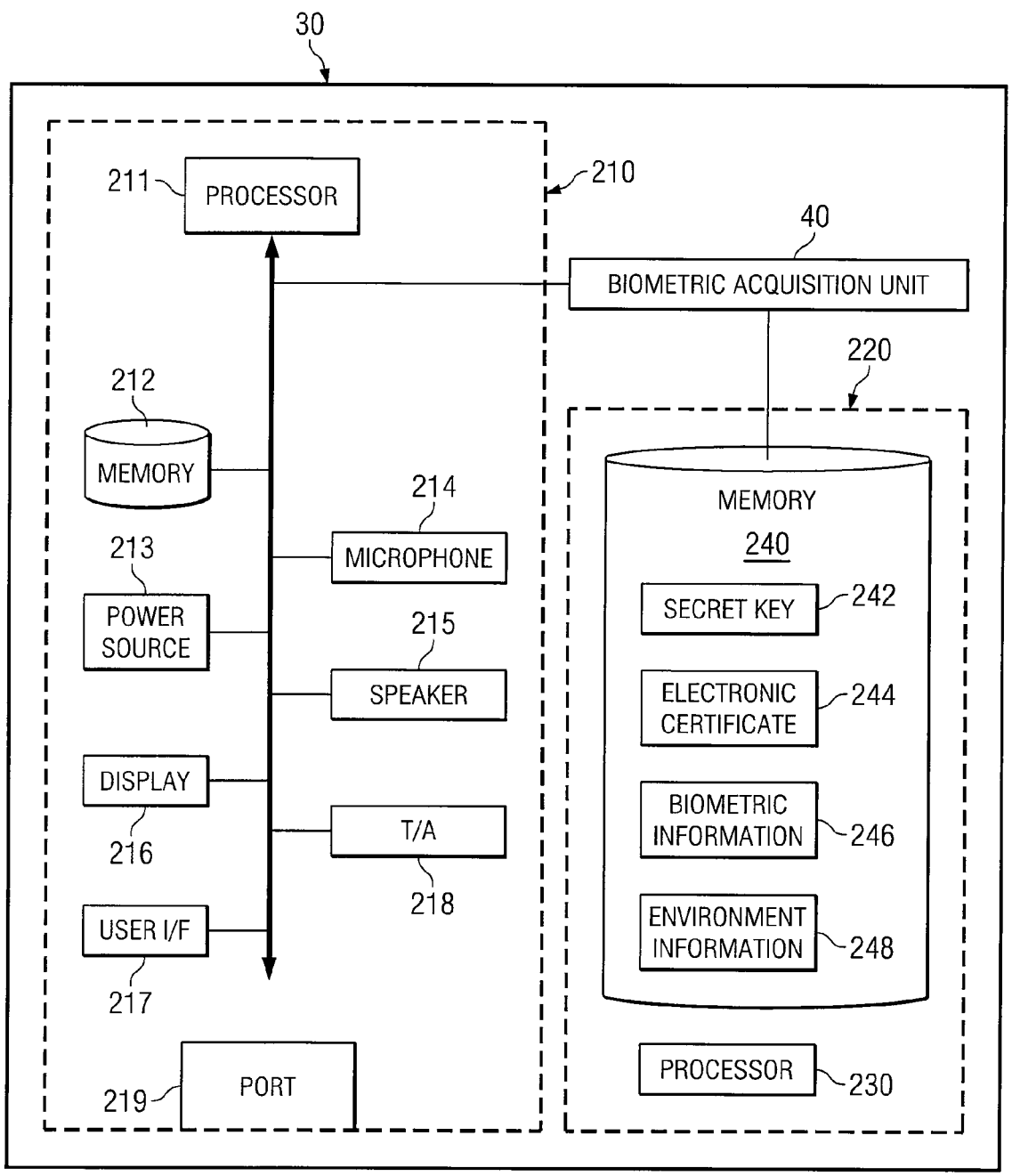
FIG. 2 is a simplified block diagram illustrating a communication device having a security chip in accordance with a particular embodiment.

With reference to FIG. 2, a simplified block diagram illustrating various functional components of a communication device 30 and their operation is provided in accordance with a particular embodiment. The illustrated communication device 30 includes communication components 210, biometric acquisition unit 40, and security chip 220. It should be noted that while the illustrated communication device 30 includes communication components 210 and is a telephony enabled device, communication device 30 may also be, for example, a computer or PDA. Additionally, in certain embodiments, biometric acquisition unit 40 and/or security chip 220 may be decoupled and integrated with other suitable devices and components, such as, for example, a PDA or computer.

Communication components 210 may facilitate the previously described communication functions for a communication device 30. As illustrated, communication components 210 include a processor 211, memory unit 212, power source 213, microphone 214, speaker 215, display 216, user interface 217, and transmit/receive circuitry 218. Communication components 210 may also include a port 219 which may allow communication device 30 to interface with other components and devices. Examples of port 219 may include a universal serial bus (USB), D-subminiature connector, 8P8C connector, or a radio frequency connector. While example communication components 210 are illustrated and described, communication components 210 may include any devices, software and/or encoded logic to provide communication services to a user.

Security chip 220 may generally be a client side device for facilitating secure communications between a communication device 30 and service provider 60 (illustrated in FIG. 1). As illustrated, security chip 220 includes a processor 230 and a memory 240. In general, security chip 220 may encrypt and decrypt messages and other communications using a private key associated with a particular user and/or communication device 30. More particularly, security chip 220 may generate and sign a digital certificate request, send the request to a verification server 40 (shown in FIG. 1), and forward the digital certificate to the service provider.

It should be noted that the components of security chip 220 may be rearranged, modified, or combined with other components and devices. For example, security chip 220 may be implemented as part of the general processor and/or memory of a device. Additionally, security chip 220 may be a peripheral module or device which is separate from the other components illustrated in FIG. 2.

Processor 230 may interface with memory 240 to execute commands and instructions associated with the functionality provided by security chip 200. Examples of processor 230 include, but are not limited to, application-specific integrated circuits (ASICs), field-programmable gate arrays (FGPAs), digital signal processors (DSPs), and any other suitable specific or general purpose processors.

Memory 240 may store software and any other appropriate information used by security chip 200. In particular, memory 240 may store software and/or encoded logic for execution by processor 240. As illustrated, memory 230 includes a secret key file 242; an electronic certificate file 244 storing a digital certificate issued by verification server 50; a biometric information file 246; and an environment information file 248. Examples of memory 240 include, but are not limited to, random access memory (RAM) devices, dynamic random access memory (DRAM), read only memory (ROM) devices, magnetic storage devices, optical storage devices, flash memory, or any other suitable data storage devices.

Secret key file 242 may store a private key associated with a communication device 30. In public key cryptography, a private key may generally be used to sign and/or encrypt messages and other communications transmitted from a client device, such as communication device 30 to a host or service provider. Verification of the authenticity of the signature may be performed using a corresponding public key. The private key may also be used to decrypt messages and other communications encrypted with the corresponding public key. According to one embodiment, secret key file 242 may store multiple private keys associated with multiple registered users of a communication device 30. Alternatively, secret key file 242 may store a single private key generally associated with a given communication device 30 The public-private key pair may generally be assigned to a user and/or a communication device 30 when communication device 30 is initially registered with identity verification system 10 of FIG. 1.

Electronic certificate file 244 may store a digital certificate issued by verification server 50. Among other things, the digital certificate may include the digital signature of verification server 50, the public key associated with the user of communication device 30, and the identity of the communication device 30 and/or a registered user. Accordingly, the digital certificate may be used to verify that the public key belongs to a specific user and/or communication device 30. As mentioned, the digital certificate may be used by communication device 30 to satisfy a request for proof of identity from a service provider.

Biometric information file 246 may generally store biometric profiles containing biometric information associated with one or more users of communication device 30. For instance, if communication device 30 is programmed to verify the identity of a user based on a fingerprint, then biometric information file 246 may store the fingerprint(s) of one or more designated users of communication device 30. By contrast, if communication device 30 is programmed to verify the identity of a user based on vocal characteristics, then biometric information file 246 may store a voice recording associated with one or more of the designated users of communication device 30. Notwithstanding the method of identity verification, the relevant information may be written to biometric information file 246 when communication device 30 is initially registered. Additionally, in certain embodiments, the biometric profile of a user may also be associated with a private-public key pair assigned to the user. Thus, a user's biometric profile may be used to not only verify the identity of the user, but also associate the user with a private key.

In operation, processor 230 may verify and/or authenticate the identity of a user of communication device 30 by comparing the output of biometric acquisition device 40 with one or more profiles stored in biometric information file 246. As one example, if the identity of a user is to be verified based on a fingerprint, then biometric acquisition device 40 may scan and output the fingerprint of the user. Processor 230 may thereby compare the outputted fingerprint information with one or more fingerprints associated with designated users of communication device 30 and stored in biometric information file 246. It should be noted that biometric information file 246 need not be stored in memory 240. In certain embodiments, biometric information file 246 may be stored at verification server 60. In such case, the biometric information may be encrypted and transmitted to verification server 50 which may authenticate the identity of the user in a manner similar to that described.

Environment information file 248 may contain information relating to communication device 30 and installed or connected components. Such information may be continuously collected and updated by processor 230. For example, when communication device 30 is a mobile phone, processor 230 may acquire the device name and version and store each in environment information file 248. As another example, when communication device 30 is a microwave oven, the manufacturer's name, device name, model number, etc. may be acquired. Processor 230 may also acquire information about equipment connected to communication device 30 via port 219. For instance, when a computer is connected to port 219, the equipment name and other information may be acquired and stored in environment information file 248.

Environment information file 248 may also include information related to software installed on communication device 30. Such information may include the name and version of the software, the operation system name and version, or any other identifier associated with the software. Accordingly, when communication device 30 is a personal computer, the environment information may be for example, Windows or Linux, may be acquired as the name of the operating system, the "third edition" may be acquired as the version of the operating system, Internet Explorer may be acquired as the browser, and "SPT" may be acquired as the version of the browser. To obtain this information, processor 230 may scan memory 212 for installed operating systems. Additionally or alternatively, processor 230 may monitor the BIOS, operating system, etc. and when new software is installed, or when new equipment is connected to port 219, processor 230 may collect and store the information about the software or the equipment as environment information in environment information file 248.

To illustrate the functionality associated with security chip 220, assume that a user of communication device 30 has requested one or more services from a service provider. Further assume that the service provider has requested proof of the user's identity to proceed with the transaction. In a PKI environment, such as identity verification system 10 of FIG. 1, obtaining a digital certificate that establishes proof of the user's identity, may generally require a client device to prepare and transmit a request for a digital certificate signed with a private key associated with the user and/or device.

According to a particular embodiment, the private keys associated with one or more users of communication device are securely stored, or locked, in secret key file 242. Access to the private key may only be granted to a user that is able to provide biometric information that matches a profile stored in biometric information file 242. Thus, in response to receiving the request for proof of identity from a service provider, processor 230 may activate biometric acquisition device 40 and signal the user to provide the relevant biometric information. Once a user has provided the requested biometric information, processor 230 may access biometric information file 246 and compare the provided biometric information with one or more profiles associated with registered users of the communication device 30 and stored in biometric information file 246. If the received biometric information matches a profile contained in biometric information file 246, then processor 230 may unlock the private key associated with the registered user and/or communication device 30 from secret key file 242.

At this point, processor 230 may generate and send a request for a digital certificate. Such a request may include the identity of the user and be signed with the private key associated with the registered user. In certain embodiments, the request may also include information form environment information file 248. Such information may allow the verification server 50 to confirm that the software and/other components associated with the user's communication device 30 have not been corrupted or tampered with. Once processor 230 generates the request for the digital certificate, it may send the request to an appropriate verification server 50.

As discussed, the verification server may store a public key associated with the registered user. The public key may generally be used to authenticate the digital signature associated with a request for a digital certificate. If the request is determined to be authentic, then the verification server may generate a digital certificate and sign the certificate with a private key associated with the verification server. The digital certificate may send the request to the communication device 30.

In response to receiving the digital certificate, processor 230 of security chip 220 may store the certificate in electronic certificate file 244. Processor 230 may also forward the certificate to the service provider and thereby satisfy the request for proof of identity. The service provider may verify the authenticity of the digital certificate using the public key of the verification server which may generally be well known.

Figure 3:
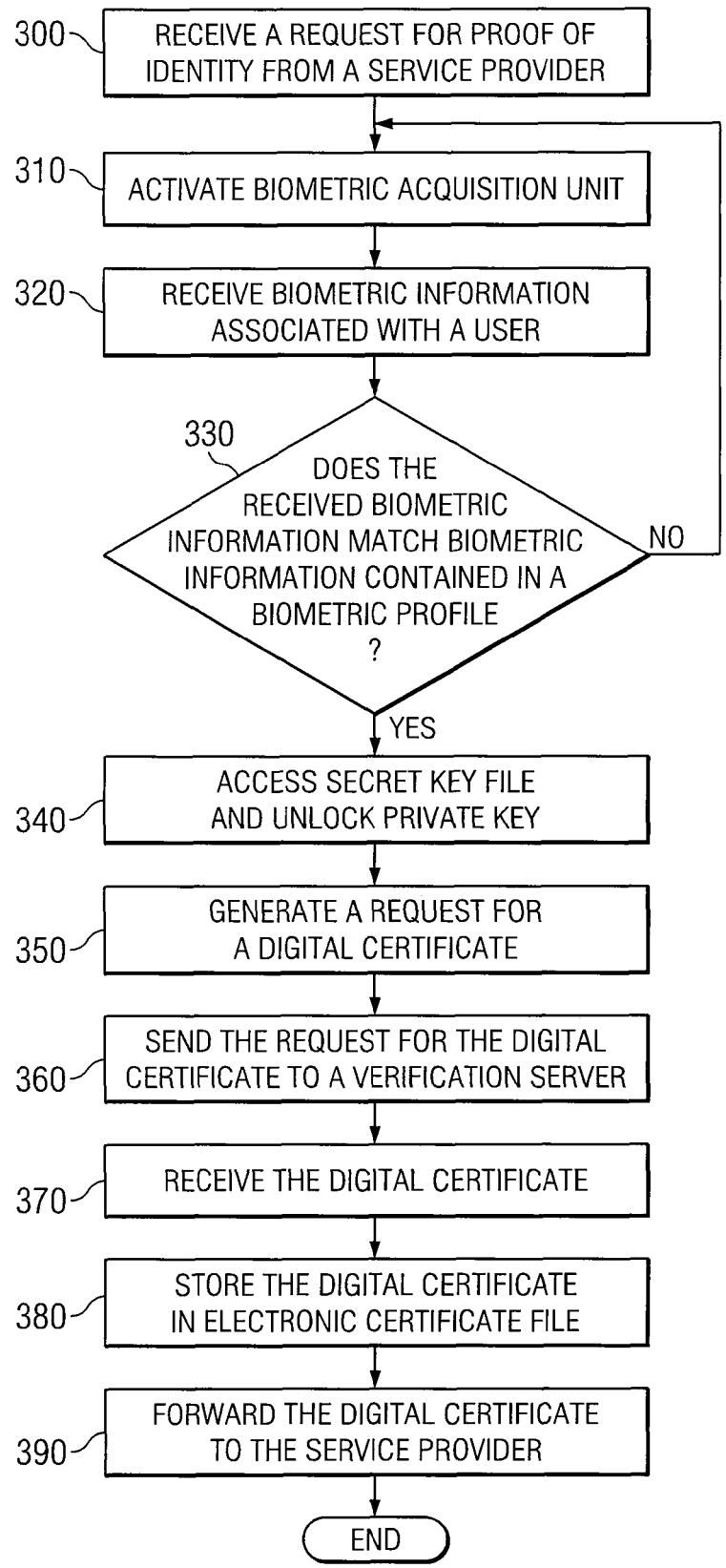
FIG. 3 is a flowchart illustrating a method for identity verification in accordance with a particular embodiment of the present invention.

With reference to FIG. 3 a flow chart describing an example operation of a security chip 220 in providing identity verification. The disclosed process begins at step 300 wherein a request for proof of identity is received from a service provider 60. This request may be sent in response to a user requesting one or more services from the service provider 60 using a communication device 30.

At step 310, security chip 220 may activate biometric acquisition unit 40. At this point, security chip 220 may also prompt the user to provide biometric acquisition unit 40 with the appropriate biometric information. In response to receiving the user's biometric information at step 320, security chip 220 may compare the provided biometric information to the biometric information contained in one or more biometric profiles stored in biometric information file 246. At step 330, security chip 220 may determine whether the provided biometric information matches a biometric profile stored in biometric information file 246. As mentioned, a biometric profile may contain biometric information associated with a registered user of the communication device 30. If there is a match, then security chip 220 may access secret key file 242 and unlock the private key associated with the matching profile at step 340. If there is not a match, then security chip 220 may re-prompt the user to provide biometric acquisition unit 40 with the appropriate biometric information and the process may return to step 310.

After unlocking the private key, security chip 220 may generate a request for a digital certificate at step 350. The request may be signed using the private key associated with the registered user that has a biometric profile containing biometric information that matches the received biometric information. Once the request is generated and signed, the request may be sent to an appropriate verification server 50 at step 360.

Next, at step 370, security chip 220 may receive a digital certificate from the verification server 50. Whether or not a digital certificate is sent to security chip 220 will depend on whether the digital signature contained in the request for the digital certificate was determined to be authentic by the verification server 50. As discussed, authentication of the digital signature may be performed using the public key associated with the user designated in the request. If security chip 220 receives a digital certificate from the verification server 50 at step 370, then it may store the digital certificate in electronic certificate file 244 at step 380. The digital certificate may include, among other things, the public key associated with the registered user and be signed using a private key associated with the verification server. At step 390, Security chip 220 may forward the digital certificate to the service provider 60 so that the service provider can determine whether to provide service based on the received digital certificate.

One skilled in the art will readily recognize that some of the steps provided in FIG. 3 may be combined, modified, rearranged, or deleted where appropriate. Moreover, additional steps may also be added to the flowchart and the described steps may be performed in any suitable order without departing from the scope of the present disclosure.

Additionally, numerous other changes, substitutions, variations, alterations and modifications may be ascertained by those skilled in the art and it is intended that the present disclosure encompass all such changes, substitutions, variations, alterations and modifications as falling within the sprit and scope of the appended claims.

What is claimed is:

1. A method for identity verification comprising:
   at a communication device, receiving a request for proof of identity from a service provider;
   at the communication device, receiving biometric information associated with a user of the communication device;
   at the communication device, determining that the received biometric information matches a biometric profile, wherein the biometric profile contains biometric information associated with a registered user of the communication device;
   at the communication device, unlocking a private key associated with the registered user in response to determining that the received biometric information matches a biometric profile;
   sending a request for a digital certificate from the communication device to a verification server, wherein the request for the digital certificate is signed with the private key associated with the registered user;
   receiving the digital certificate from the verification server, wherein the digital certificate:
      includes a public key associated with the registered user, wherein the verification server stores a public key associated with the private key of the registered user;
      is signed using a private key associated with a verification server; and
      satisfies the request for proof of identity;
   forwarding the digital certificate from the communication device to the service provider.

2. The method of claim 1, wherein the request for the digital certificate includes environment information associated with the communication device.

3. The method of claim 1, wherein the service provider is an online store.

4. The method of claim 1, further comprising storing the digital certificate in a memory associated with the communication device.

5. The method of claim 1, wherein the private key associated with the registered user is further associated with the communication device.

6. The method of claim 1, wherein the biometric information comprises one or more of:
   a fingerprint;
   a voice; and
   a retinal pattern.

7. The method of claim 1, further comprising receiving one or more requested services in response to forwarding the digital certificate to the service provider.

8. The method of claim 1, further comprising:
   authenticating the request for the digital certificate using a public key associated with the registered user;
   generating the digital certificate in response to authenticating the request for the digital certificate;
   signing the digital certificate using a private key associated with a verification server; and
   authenticating the digital certificate using a public key associated with the verification server.

9. A communication device for identity verification comprising:
   a memory operable to store a biometric profile, wherein the biometric profile includes biometric information associated with a registered user of the communication device;
   a processor coupled to the memory and operable to:
      receive a request for proof of identity from a service provider;
      receive biometric information associated with a user of a communication device;
      determine that the received biometric information matches biometric information associated with the registered user;
      unlock a private key in response to determining that the received biometric information matches biometric information associated with the registered user, wherein the private key is associated with the registered user;
      send a request for a digital certificate to a verification server, wherein the request for the digital certificate is signed with the private key associated with the registered user;
      receive a digital certificate from the verification server, wherein the digital certificate:
         includes a public key associated with the registered user, wherein the verification server stores a public key associated with the private key of the registered user;
         is signed using a private key associated with a verification server; and
         satisfies the request for proof of identity; and
      forward the digital certificate to the service provider.

10. The apparatus of claim 9, further including a biometric acquisition unit, wherein the biometric acquisition unit is operable to:
    receive biometric information from a user of a communication device; and
    forward the received biometric information to the processor.

11. The apparatus of claim 9, wherein the memory further stores:
    a secret key file including one or more private keys associated with each of the registered user; and
    an environment information, wherein the environment information file indicates:
       whether one or more software components are installed on the communication device;
       the model number of the communication device; and
       version of the communication device.

12. The apparatus of claim 9, wherein a processor operable to send a request for a digital certificate comprises a processor operable to send a request for a digital certificate including environment information associated with the communication device, wherein the environment information indicates:
    whether one or more software components are installed on the communication device;
    the model number of the communication device; and
    version of the communication device.

13. The apparatus of claim 9, wherein the service provider is an online store.

14. The apparatus of claim 9, wherein the private key associated with the registered user associated is further associated with the communication device.

15. The apparatus of claim 9, wherein the biometric information comprises one or more of:
    a fingerprint;
    a voice; and
    a retinal pattern.

16. The apparatus of claim 9, wherein a processor operable to unlock a private key comprises a processor operable to unlock a private key in response to determining that the received biometric information matches biometric information associated with the registered user.

17. The apparatus of claim 9, wherein the processor is further operable to receive one or more requested services in response to forwarding the digital certificate to the service provider.

18. Logic encoded on a non-transitory computer readable medium for execution, and when executed operable to:
- at a communication device, receive a request for proof of identity from a service provider;
- at the communication device, receive biometric information associated with a user of the communication device;
- at the communication device, determine that the received biometric information matches a biometric profile, wherein the biometric profile contains biometric information associated with a registered user of the communication device;
- at the communication device, unlock a private key associated with the registered user in response to determining that the received biometric information matches a biometric profile;
- send a request for a digital certificate from the communication device to a verification server, wherein the request for the digital certificate is signed with the private key associated with the registered user;
- receive the digital certificate from the verification server, wherein the digital certificate:
  - includes a public key associated with the registered user, wherein the verification server stores a public key associated with the private key of the registered user;
  - is signed using a private key associated with a verification server; and
  - satisfies the request for proof of identity;
- forward the digital certificate from the communication device to the service provider.

* * * * *